US006047805A

United States Patent [19]

Nyquist et al.

[11] Patent Number: 6,047,805

[45] Date of Patent: *Apr. 11, 2000

[54] ELECTRIC CLUTCH AND BRAKE

[75] Inventors: Stephen Nyquist, Simsbury; Kevin L. Maurice, Bristol, both of Conn.

[73] Assignee: Inertia Dynamics, Inc., Collinsville, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,816

[22] Filed: Sep. 29, 1997

[51] Int. Cl.[7] .............................. F16D 19/00; F16D 13/08

[52] U.S. Cl. ....................................... 192/84.81; 192/81 C

[58] Field of Search ............................... 192/84.81, 84.8, 192/81 C, 12 BA, 17 C, 12 D

[56] References Cited

U.S. PATENT DOCUMENTS

| | | | |
|---|---|---|---|
| 3,095,071 | 6/1963 | Mason | 192/84.81 X |
| 3,149,705 | 9/1964 | Shoquist | 192/84.81 X |
| 3,149,706 | 9/1964 | Mason et al. . | |
| 3,171,523 | 3/1965 | Shoquist | 192/84.81 X |
| 3,177,996 | 4/1965 | Bates | 192/84.81 X |
| 3,642,106 | 2/1972 | Baer | 192/84.961 X |
| 3,685,622 | 8/1972 | Baer et al. | 192/84.81 X |
| 4,271,948 | 6/1981 | Yew | 192/84.8 |
| 5,967,274 | 10/1999 | Leone et al. | 192/84.81 X |

*Primary Examiner*—Charles A. Marmor
*Assistant Examiner*—Scott Lund
*Attorney, Agent, or Firm*—Cummings & Lockwood

[57] ABSTRACT

A combination clutch and brake uses a helically wound spring attached to a pulley at one edge and magnetically drawn to a rotor at a second edge. In a relaxed state, the spring presses against an outer field cup locking the pulley against that cup. In a torsion state caused by the magnetic attraction between the rotor and the spring, the spring decreases in diameter to compress a frictional wedge inward against the pulley and rotor causing them to turn as one.

10 Claims, 3 Drawing Sheets

10
12
13
14
16
18
20
22
24
26
28
30
32
34
36
38
40
42
44
45
46
47
48
50
52
54
56
58
60
62
64
66
68

24
44
22
38
66
64
26
40
54
34
14
32
46
45
18
13
12
16
20
28
42
56
64
58,60

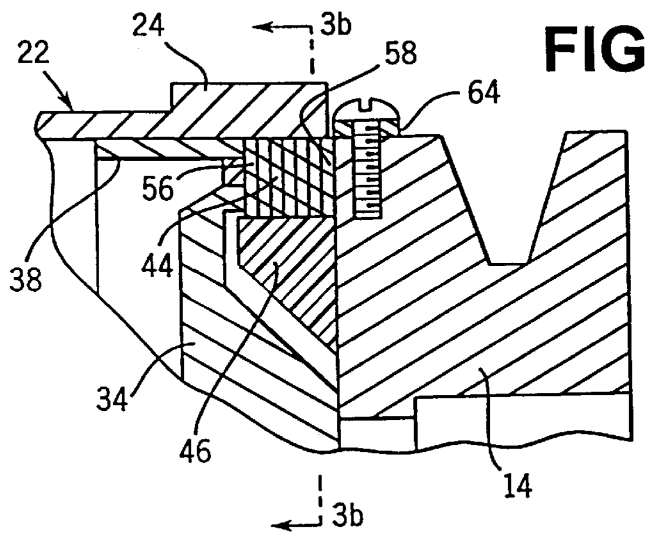
FIG. 3a
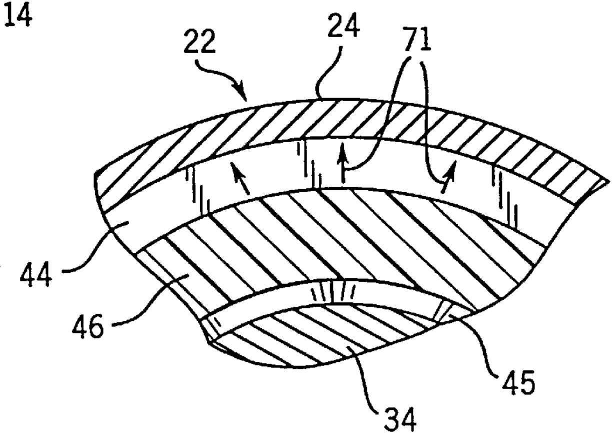
FIG. 3b
FIG. 4a
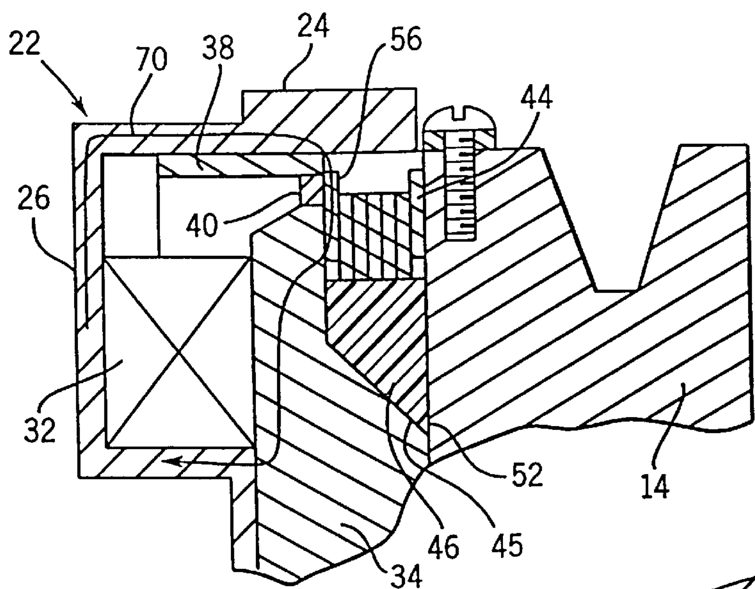
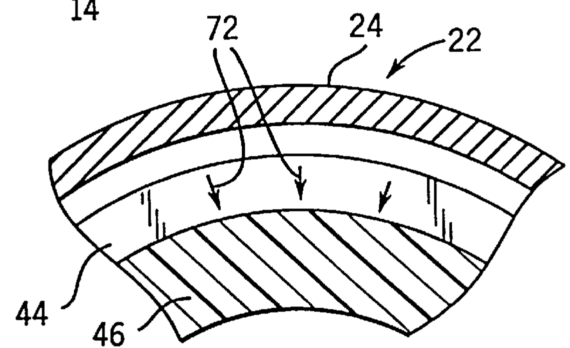
FIG. 4b

ELECTRIC CLUTCH AND BRAKE

CROSS-REFERENCE TO RELATED APPLICATIONS

STATEMENT REGARDING FEDERALLY SPONSORED RESEARCH OR DEVELOPMENT

BACKGROUND OF THE INVENTION

Clutches are used generally to control the transmission of torque between rotating machine elements. Positive clutches, when engaged, lock the elements together to rotate as one. Such clutches may be "self-energizing" to the extent that the force of engagement increases as the torque between the shafts increases.

It is known to produce electrical, self-energizing, positive clutches using a helical spring attached at one end to one rotating machine element, and electromagnetically attracted to the second rotating machine element by an electromagnetic coil when the clutch is to be activated. Twisting of the helical spring caused by relative motion of the two rotating machine elements causes the spring to tighten about an annular wedge of frictional material to press it against opposed faces of the two machine elements bringing them into frictional linking. The helical spring and the wedge shape of the frictional material define a mechanical advantage that may allow a relatively low force of attraction between the electromagnetic and the helical band to nevertheless provide a high torque coupling of the two machine elements. One example of such a clutch is found in U.S. Pat. No. 3,149,706, filed Sep. 22, 1961 and hereby incorporated by reference.

Often it is desirable, when the clutch is disengaged, to lock the driven machine element in place to prevent freewheeling. For this purpose, an electric brake may be attached to the driven machine element. Circuitry must be provided to energize the brake when the electric clutch is de-energized. The use of an electric brake increases the cost and size of the total drive mechanism.

BRIEF SUMMARY OF THE INVENTION

The present invention provides a combination electrical clutch and brake sharing many components to reduce bulk and expense. Generally, the invention modifies the helical spring clutch mechanism so that when the spring is untorsioned, it expands radially outward against a brake sleeve restraining the driven machine element from free rotation. When torsioned, the helical band compresses a friction material to interconnect the driven machine element with the driving machine element while simultaneously releasing itself from the brake sleeve.

Specifically, the present invention provides an electronic clutch and brake having a helical spring coaxial with an axis of rotation, the helical spring having a first and second end. A first machine element rotatable about the axis of rotation is attached to a first end of the helical spring. The first machine element has the first friction surface disposed on a first radial side of the helical spring. A second machine element rotatable about the axis of rotation has a second friction surface disposed on the first radial side of the helical spring and further has a pole face adjacent to the second end of the helical spring. An electromagnetic coil is positioned adjacent to the pole face so as to pull the second end of the helical spring into contact with the pole face when electrical current is passed through the electromagnetic coil. A retention plate having a third frictional surface is disposed on a second radial side of the helical spring opposite the first radial side of the helical spring. The helical spring causes frictional linking between the third frictional surface and the first machine element in a relaxed state when no current flows through the electromagnetic coil. The helical spring causes a frictional linking between the first and second frictional surfaces in a torsion state when current flows through the electromagnet coil.

Thus, it is one object of the invention to provide a simple combination clutch and brake mechanism. The same helical spring providing a frictional linking between the first and second machine elements provides a braking action to the first machine element when engaging this retention plate.

It is another object of the invention to provide a combination clutch and brake assembly in which clutching and braking action are mutually exclusive, reducing the possibility of unintentional clutch or brake wear. Because this same helical spring in alternate states provides both braking and clutching, the clutch and brake may not be simultaneously activated.

The first radial side of the helical spring may be the inside of the helical spring and the second radial side may be the outside of the helical spring.

It is another object of the invention, therefore, to provide an extremely compact brake clutch assembly. By placing the frictional surfaces in opposition radially, the total shaft length of the clutch brake assembly need not be increased over what would be required for the clutch alone.

The retention plate may be an annular cylinder coaxial with the axis of rotation having a radially inner surface adjacent to the outer radial surface of the helical spring. The frictional linking between the third frictional surface and the first machine element may be caused by a contacting of the outer radial surface of the helical spring with the inner surface of the annular cylinder.

Thus it is another object of the invention to provide an extremely simple clutch and brake mechanism. By allowing the helical spring to directly contact the outer annular surface of the retention plate, the brake may be implemented with essentially no additional components over that required for the clutch alone.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 3(*a*) is a fragmentary view of FIG. 2(*a*) with the clutch and brake assembly of FIG. 1 in brake mode with the helical spring in the relaxed state;

FIG. 3(*b*) is a cross-sectional view taken along line 3(*b*) of FIG. 3(*a*) showing an outward pressing of the helical spring in the relaxed mode;

FIG. 4(*a*) is a figure similar to that of FIG. 3(*a*) showing the clutch and brake assembly of FIG. 1 in clutch engaged mode with the helical spring in the torsioned state;

FIG. 4(*b*) is a view similar to that of FIG. 3(*b*) showing the helical spring pressing inward against the friction disk in the torsioned mode to cause an engagement of the clutch.

DETAILED DESCRIPTION OF THE INVENTION

Figure 1:
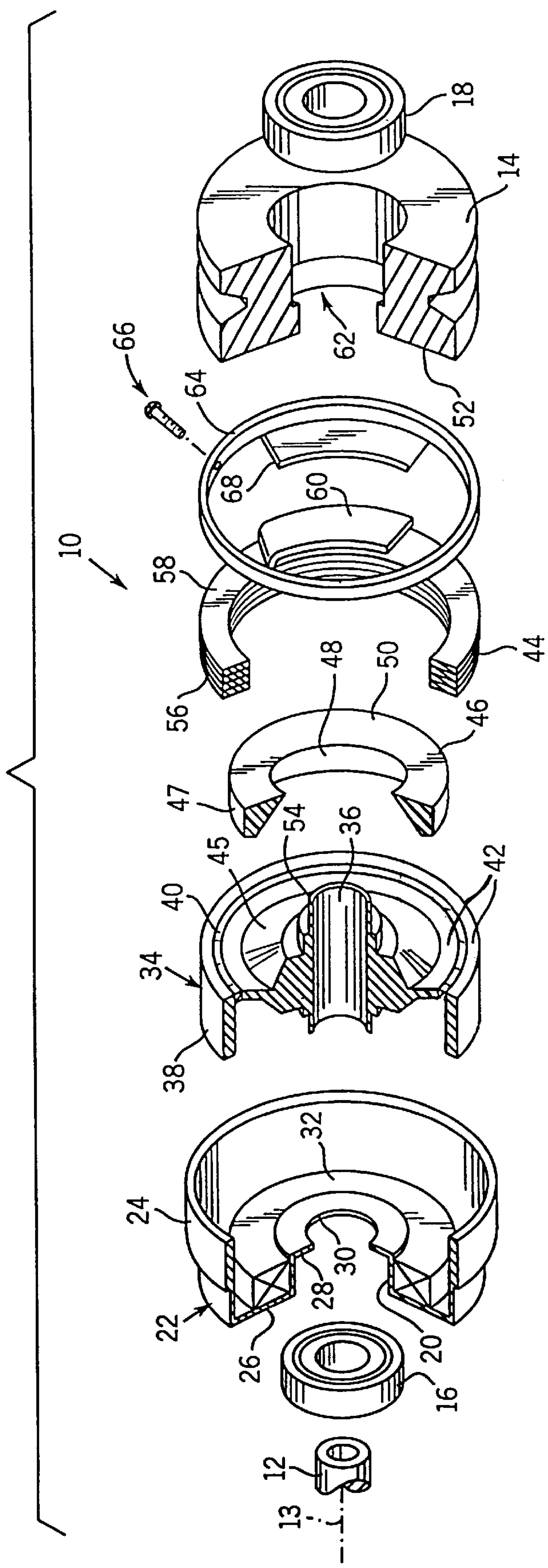
FIG. 1 is an exploded perspective view in quarter cross-section showing the components of the clutch and brake assembly of the present invention including the helical spring.
Figure 2:
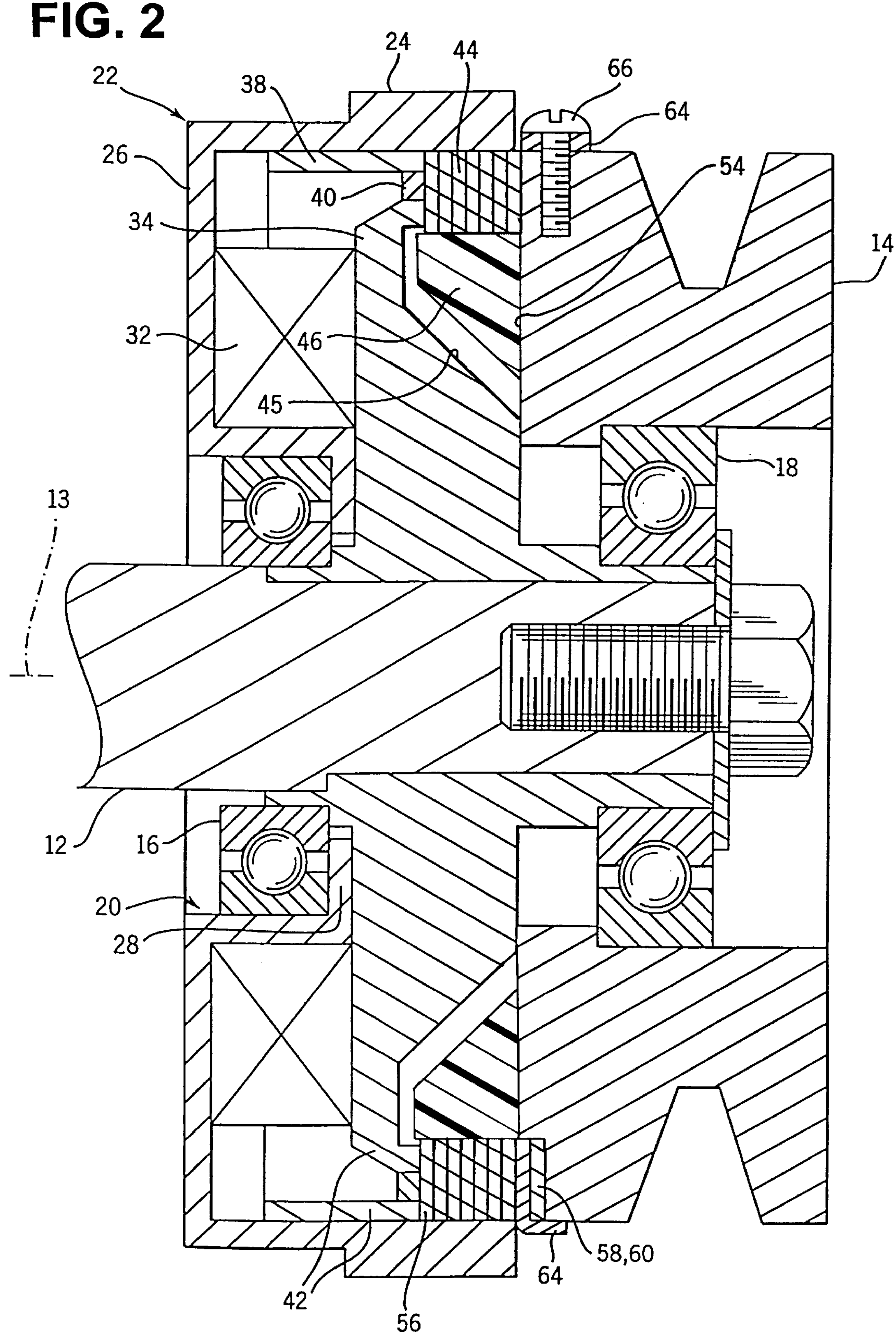
FIG. 2 is an elevational cross-section of the clutch and brake assembly of FIG. 1 in brake mode with the helical spring in the relaxed state.

Referring now to FIG. 1, the clutch and brake assembly 10 of the present invention when engaged, connects a drive shaft 12 extending along an axis of rotation 13 to a pulley 14. The pulley 14 and drive shaft 12 are independently supported by bearings 16 and 18.

A generally cylindrical field cup 22 opening toward a front of the clutch and brake assembly 10 is constructed of steel or other ferromagnetic material and has a tubular outer wall 24 coaxial with axis 13. The field cup 22 and is partially closed at a rear end by a base plate 26. Centered in the base plate 26 is a rearward opening recess 20 which supports the outer surface of bearing 16. A floor 28 of recess 20 has an aperture 30 sized to receive the shaft 12 passing through the bearing 16 with the bearing 16 restrained from further frontward axial motion by the floor 28 surrounding aperture 30. Field cup 22 includes mounting means (not shown) for mounting it in a stationary position with respect to shafts 12 and pulley 14.

Positioned within the field cup 22 against the base plate 26, coaxial with axis 13 and around the recess 20, is an electromagnet coil 32. The electromagnet coil 32 has leads (not shown) so that current may be passed through electromagnet coil 32 to create a magnetic field extending along axis 13 as will be described.

Fitting within the tubular outer wall 24 of field cup 22 is a generally disk-shaped rotor 34 having a keyed axial bore 36 receiving shaft 12 to turn with shaft 12. The outside diameter of rotor 34 provides an annular cylindrical wall 38 adjacent to the inner surface of tubular outer wall 24 of the field cup 22. A front edge of the annular cylindrical wall 38 is attached to the hub of the rotor 34 through a ring shaped copper swedge 40. The copper swedge 40 breaks the magnetic path for flux passing through the other parts of the rotor 34 which are constructed of a ferromagnetic material to preferentially conduct magnetic field lines therethrough.

The front surface of the ferromagnetic portions of the rotor 34 immediately inside and outside of the copper swedge 40 form a pole face 42 against which an adjacent winding of a coaxial helical spring 44 may be drawn when the electromagnet coil 32 is actuated. This pole face 42 is generally perpendicular to the axis 13.

Radially inside the pole face 42 is a sloping friction surface 45 forming a truncated cone extending forward over shaft 12.

Pulley 14 is assembled to the brake clutch 10 by means of bearing 18 fitting over a front protruding support surface 54 of the rotor 34. The inside of the bearing 18 is supported on the support surface 54 and the outside of the bearing fits within a bore in the pulley 14.

A friction disk 46 approximately in equal diameter to the friction surface 45 has one diagonal face 48 generally conforming to the friction surface 45 when the disk is arranged coaxially about the axis 13 between the rotor 34 and the pulley 14. The friction disk 46 is a single-piece ring split with a radial gap at one point and composed of any well known brake-lining material. The friction disk 46 includes a central aperture to allow free rotation of the shaft 12 and rotor 34 and friction surface 45 within the friction disk 46 absent any compression of the friction disk 46 against friction surface 45.

A radial face 50 of friction disk 46, opposed generally to diagonal face 48 of the friction disk 46 but extending perpendicularly to the axis 13, abuts a similarly extending friction surface 52 of pulley 14. A pressing radially inward of the friction disk 46 thus presses faces 48 and 50 against friction surfaces 45 and 52 establishing a frictional linking between the rotor 34 and the pulley 14.

Positioned coaxially about the friction disk 46 on its radial outward surface is a helical spring 44 having individual coils with a generally rectangular cross-section. The helical spring 44 has an inner coil 56 lying generally within a plane perpendicular to axis 13 and adjacent to pole face 42 of rotor 34. The helical spring 44 also has an outer coil 58 having a protruding end 60 received within a recess 62 in pulley 14 and held within that recess by a retaining ring 64.

Retaining ring 64 is a cylindrical annular ring fitting over a portion of the outside diameter of the pulley 14 and secured with a machine screw 66 and an inward extending ear 68 sandwiching the protruding end 60 between the ear 68 and the recess 62 of the pulley 14. Retaining ring 64 thus attaches one end of the helical spring 44 to pulley 14.

Friction disk 46 has a radially outward edge 47 aligned with the axis 13 opposing and abutting the radial inner edge of the helical spring 44. A decrease in the effective diameter of the helical spring 44 (as may be caused by torsion of the helical spring 44) presses the friction disk 46 radially inward to wedge between friction surface 45 of rotor 34 and friction surface 52 of pulley 14 frictionally locking them together.

Referring now also to FIGS. 3(*a*) and 3(*b*), generally the helical spring 44 is wound so that when it is in a relaxed mode (without appreciable torsion or extension), it has an outer diameter slightly larger than the inner diameter of the tubular outer wall 24 of the field cup 22. Thus, the outer edge of the helical spring 44 presses radially outward against the inner edge of the tubular outer wall 24 as shown by arrows 71 effectively locking the pulley 14 which is attached to the helical spring 44 in a stationary position against the field cup 22. The field cup 22 acts as a retention plate preventing motion of the pulley 14 with respect to the field cup 22. Frictional forces between the helical spring 44 and the tubular outer wall 24 that would cause an unwinding of the helical spring 44 with motion of the pulley 14 increase this outward pressing.

Referring now to FIGS. 4(*a*) and 4(*b*), when electromagnet coil 32 is energized, magnetic flux 70 passes upward through base plate 26 and along tubular outer wall 24 of the field cup 22 passing into annular cylindrical wall 38 of the rotor 34 and then through the inner coil 56 of the helical spring 44 which offers a lower resistance path than the copper swedge 40. The flux line then passes backward into the body of rotor 34 and then into the recess forming wall of the field cup 22 to complete its circuit.

The attraction of inner coil 56 of helical spring 44 causes a frictional linking between the inner coil 56 and the rotor 34. The winding of the helical spring and the loading of the shaft 12 and pulley 14 is such as to tighten the windings of the helical spring 44 causing its inner and outer diameters to contract releasing the helical spring 44 from frictional linking with the tubular outer wall 24 and causing its inner diameter to compress friction disk 46 downward against friction surfaces 45 of rotor 34 and 52 of pulley 14. This frictional linking causes pulley 14 to turn with rotor 34 and thus with shaft 12 (not shown) in FIG. 4(*a*). The compressive force exerted by the helical spring 44 on the friction disk 46 is illustrated by arrows 72.

The above description has been that of a preferred embodiment of the present invention. It will occur to those that practice the art that many modifications may be made without departing from the spirit and scope of the invention. For example, the field cup 22 need not be stationary but could serve as a second driving means at a different speed or direction than shaft 12. It will be understood that additional frictional material may be placed between helical spring 44 and tubular outer wall 24 to improve the contact therebetween. Further, it will be understood that the inward and outward direction of the helical spring may be reversed with the helical spring having a bias inward to normally compress friction disk 46 inward with the action of the rotor 34 on inner coil 56 unwinding the spring to cause frictional linking between the spring and the field cup 22. In order to apprise the public of the various embodiments that may fall within the scope of the invention, the following claims are made:

We claim:

1. An electric clutch and brake comprising:

a helical spring coaxial with an axis of rotation and having a first end and a second end;

a first machine element rotatable about the axis of rotation and attached to the first end of the helical spring, the first machine element having a first frictional surface disposed on a first radial side of the helical spring;

a second machine element rotatable about the axis of rotation and having a second frictional surface disposed on the first radial side of the helical spring, the second machine element further having a pole face adjacent to the second end of the helical spring;

an electromagnetic coil adjacent to the pole face so as to pull the second end of the helical spring into contact with the pole face when electrical current is passed through the electromagnetic coil; and a fixed retention plate having a third frictional surface disposed on a second radial side of the helical spring opposite to the first radial side of the helical spring, wherein the helical spring is sized and positioned, when no current flows through the electromagnetic coil, to cause the helical spring to relax causing a frictional linking between the third frictional surface and the first machine element to brake the first machine element and, when current flows through the electromagnetic coil, to cause the helical spring to wrap down causing a frictional linking to serve as a clutch between the first frictional surface and the second frictional surface.

2. The electric clutch and brake recited in claim 1, further including a frictional material interposed between the helical spring and the first and second frictional surfaces.

3. The electric clutch and brake recited in claim 2, wherein the first and second frictional surfaces are adjacent and wherein at least one of the first and second frictional surfaces extend at an angle from the axis of rotation to form therebetween a V-shaped notch and wherein the frictional material provides a wedge surface pressing into the V-shaped notch when the helical spring is wrapped down.

4. The electric clutch and brake recited in claim 1, wherein the first radial side of the helical spring is inside the helical spring.

5. The electric clutch and brake recited in claim 4, wherein the fixed retention plate is an annular cylinder coaxial with the axis of rotation and has a radially inner surface adjacent to an outer radial surface of the helical spring.

6. The electric clutch and brake recited in claim 5, wherein the frictional linking between the third frictional surface and the first machine element is caused by a contacting of the outer radial surface of the helical spring with the inner surface of the annular cylinder.

7. The electric clutch and brake recited in claim 1, wherein the electromagnetic coil is affixed to the retention plate.

8. The electric clutch and brake recited in claim 1 wherein the pole face is a ferromagnetic material interrupted by a band of non-ferromagnetic material in coaxial disposition about the axis of rotation and wherein the band of non-ferromagnetic material is substantially centered on the second end of the helical spring to allow the second end to bridge the non-ferromagnetic material between the ferromagnetic material of the pole face.

9. An electric clutch and brake system comprising:

a shaft along an axis of rotation;

a fixed field cup defining an aperture concentric with the axis of rotation at a rear end and a tubular outer wall at a front end, wherein the fixed field cup includes an electromagnetic coil;

a rotor mounted to rotate about the axis of rotation with the shaft, wherein the rotor has a first friction surface and a pole face;

a friction disc mounted to rotate about the axis of rotation, wherein the friction disc has a second friction surface adjacent to the first friction surface and a third friction surface operatively positioned relative to the second friction surface;

a pulley mounted to independently rotate about the shaft, wherein the pulley has a fourth friction surface adjacent to the third friction surface; and a helical spring attached to the pulley, wherein the helical spring has an outer diameter and an inner diameter, wherein the helical spring is sized and positioned such that, when current flows through the electromagnetic coil, the helical spring is drawn to the pole face and the inner diameter wraps down on the friction disc to cause a frictional linking between the first and second friction surfaces and the third and fourth friction surfaces to act as a clutch between the rotor and the pulley and, when no current flows through the electromagnetic coil, the helical spring unwraps to cause a frictional linking between the outer diameter and the tubular outer wall to act as a brake for the pulley.

10. The electric clutch and brake assembly of claim 9, wherein the first friction surface and the second friction surface are sloping such that when the helical spring wraps down a force is created to create the frictional linking which acts as the clutch.

* * * * *